L. Dodge,
Making Axes,
Nº 31,927.    Patented Apr. 2, 1861.
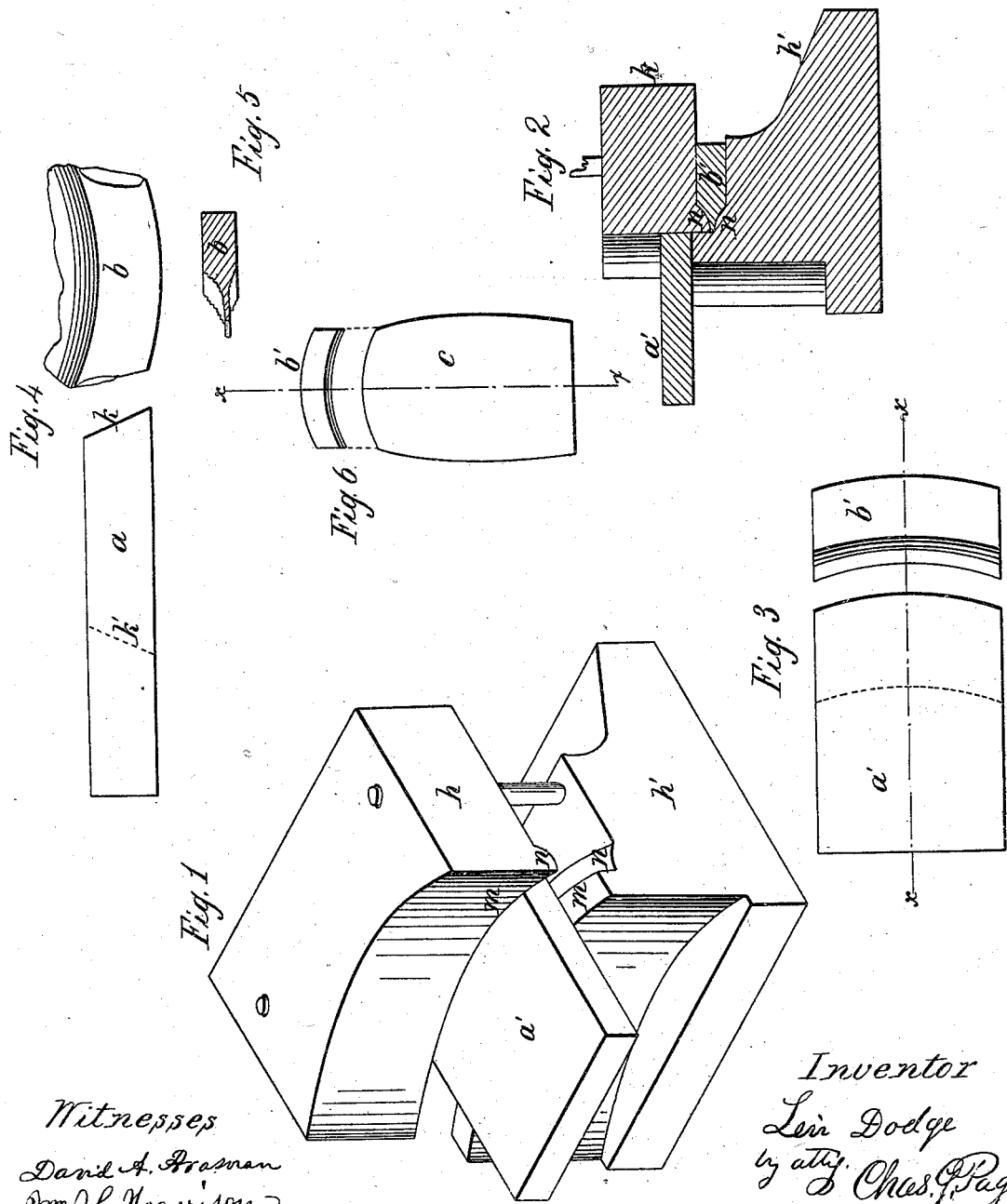
Witnesses
David A. Brosnan
Wm H. Harrison
Inventor
Lein Dodge
by atty Chas. F. Page

UNITED STATES PATENT OFFICE.

LEVI DODGE, OF COHOES, NEW YORK, ASSIGNOR TO HIMSELF AND DAVID BLAKE, OF SAME PLACE.

SHEAR FOR THE MANUFACTURE OF AXES.

Specification of Letters Patent No. 31,927, dated April 2, 1861.

*To all whom it may concern:*

Be it known that I, LEVI DODGE, of Cohoes, in the county of Albany and State of New York, have invented an Improvement in the Manufacture of Steels for the Cutting Edges of Axes, of which the following is a full, clear, and exact description of the principle or character which distinguishes it from all other things before known and of the usual manner of making, modifying, and using the same, reference being had to the accompanying drawings, of which—

Figure 1, is a perspective view of the shears and dies for cutting and forming the steels; Fig. 2 a vertical middle section through the same from front to rear; Fig. 3 a plan of bar of steel and steel-piece, on the new mode; Fig. 4 plan of bar and steel piece on the old mode; Fig. 5 cross section of steel piece, on the old mode; Fig. 6 a plan view of an ax poll and steel piece on the new mode.

My invention consists in an improvement in the manufacture of steels for axes described and represented as follows.

Hitherto the steels for the cutting edges of axes have been cut from bars of steel having a width only equal to the width of the steels the line of the length of the steel being in the line of the length of the bar of steel. For instance $b$ is the piece of steel which forms the cutting edge and which is to be welded to the ax poll $c$. This steel is cut from the end of a bar of steel $a$, whose width is equal or nearly so to the width of the steel, the cut being made at the dotted line $k'$ so as to give the required length to the steel. In the rolling of bars of steel the metal acquires a grain or fiber which is in the line of its length, this grain being represented by the red lines in Figs. 3, 4 and 6. It will be seen that when the steel $b$ thus cut from the bar is welded to the ax poll $c$ the grain is parallel to the line of weld and also to the cutting edge $e$ of the steel. Perfect steel is said to be without grain, but the drawing into bars in the manufacture, produces a kind of grain, the flaws and seams running lengthwise. The chances therefore for a perfect weld would be evidently in favor of any mode of preparing the steels which should present the grain of the steel the reverse of the above mode. When the steels are cut from the bar as above, they are cut by diagonal cuts $k$, $k'$, and are then forged under the hammer to the shape $w$ as seen in Figs. 4 and 5, and the scarf $s$ drawn down ready for welding to the ax poll $c$. Besides the considerable labor of these operations there are decided disadvantages attending them. The blow of the hammer leaves little ridges at every stroke on the steel and the bevel on one side of the scarf is greater than on the other as shown in Fig. 5, for the reason that the die in the hammer has more effect than the die in the anvil or block. Moreover there are portions of steel wasted at the first and last cuts on every bar.

All these objections I surmount by the following mode of cutting and fitting the steels. I take a bar of steel $a'$, whose width is as great as the breadth of the ax poll or the length of the steel piece $b'$ to be cut, and by means of the circular shears $m$ $m$, and dies $n$, $n$, I cut the steel and form the scarf both at one operation, cutting the steel from the end of the bar in such way that the grain shall be the reverse of the mode above described, that is, the grain shall be at right angles to the cutting edge or nearly so or parallel to the line of cut $x$, $x$. It is obvious that as this mode of presenting the grain of the steel will make a stronger weld, so also will it preserve a better cutting edge and less liable to gap. From the mode of forming the scarf the two sides are formed equal and make a better union therefore with the ax poll, the formation of the scarf being shown in Fig. 2. The circular shear edges $m$, $m$, with the dies $n$, $n$, are shown attached respectively to the upper and lower blocks $h$ $h'$, and are shown in Figs. 1 and 2. The bar of steel $a$ is shown passing between them, so much of the length of the bar being removed as is equal to the width of the steel piece to form the cutting edge. The steels thus formed are more uniform in shape and texture, make a better weld and better cutting edge, and the saving of labor in the manufacture is great.

I claim—

The employment of the circular shears and dies for cutting said steels and swaging their scarfs ready for welding in the manner set forth.

LEVI DODGE.

Witnesses:
D. BLAKE,
P. D. NIVES.